United States Patent [19]

Stoll

[11] Patent Number: 4,687,235
[45] Date of Patent: Aug. 18, 1987

[54] FLUID POWER CONNECTOR FITTINGS
[76] Inventor: Kurt Stoll, Lenzhalde 72, 7300 Esslingen, Fed. Rep. of Germany
[21] Appl. No.: 817,511
[22] Filed: Jan. 9, 1986
[30] Foreign Application Priority Data
Jan. 11, 1985 [DE] Fed. Rep. of Germany ... 8500579[U]
[51] Int. Cl.[4] .............................................. F16L 27/00
[52] U.S. Cl. ..................................... 285/281; 285/98; 285/158
[58] Field of Search ................. 285/158, 272, 98, 122, 285/275, 278, 280, 281

[56] References Cited
U.S. PATENT DOCUMENTS
3,930,674  1/1976  Jonsson .......................... 285/272 X FOREIGN PATENT DOCUMENTS
1490712  8/1967  France ................................ 285/272

Primary Examiner—Richard J. Scanlan, Jr.
Attorney, Agent, or Firm—McGlew and Tuttle

[57] ABSTRACT

The invention concerns fluid power connector fittings for joining a piece of elastic hose with a fixed structure such as bulkhead or with another piece of hose. The novel connector fitting may be thought of as comprising two sections each having a shank adapted for connection with a piece of hose or with a screw threaded hole in a structure. If the two shanks are at an angle to each other there is a swivel joint between them. If they are in line they are made integrally.

9 Claims, 5 Drawing Figures

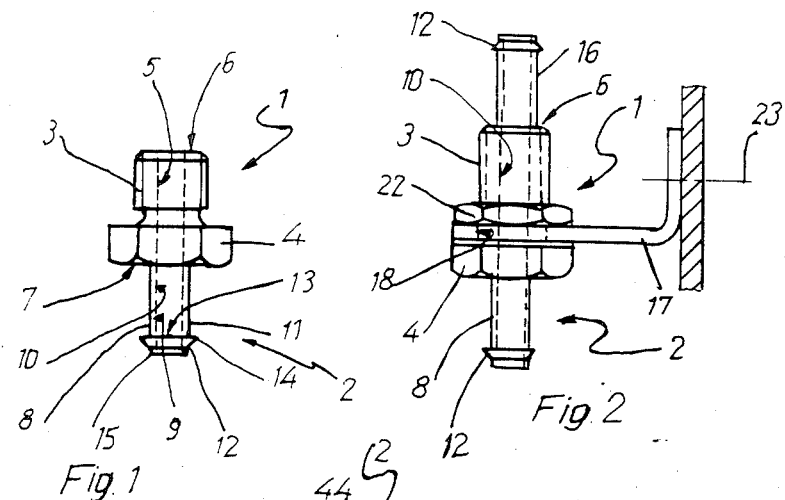
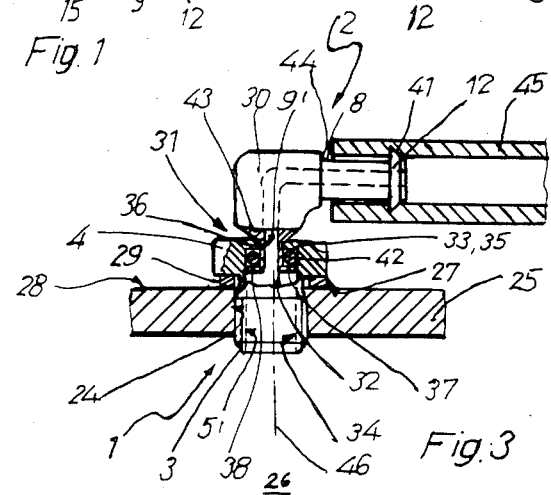
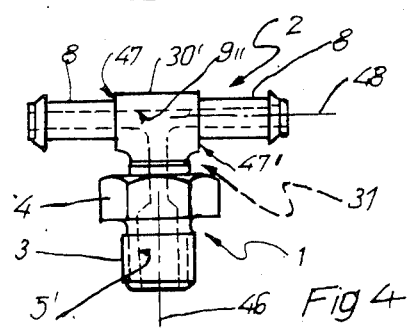

FLUID POWER CONNECTOR FITTINGS

BACKGROUND OF THE INVENTION

The invention relates to a fluid power connector fitting, for joining together pieces of elastic line or hose, or joining hose to a fixed item of equipment such as a bulkhead or the wall of a pressure vessel or the like, comprising two connector sections each having at least one connection shank, the shanks being connected with each other via a common duct.

Such connector fittings are frequently employed as providing a simple method of joining elastic lines or hose with manifolds or accumulators such as pressure vessels. Such fittings generally comprise a threaded shank on one of the two shanks and a hose connection shank on the other section. For attaching the fitting, its threaded shank is screwed into a threaded hole of the manifold or the like to make a sealed mechanical connection, and the line or hose is joined to the hose shank. More especially in the event of a flow path through the connector fitting departing from a straight line there have so far frequently been difficulties in so adjusting the connector fitting that the hose connection shank is in the line with the desired direction of flow out of the fitting. The ultimate setting of the hose connector fitting will be determined by the respective length of thread on the thread shank. Exact positioning is therefore frequently an involved process, and changing the position is only possible by using shims. If the parts are not exactly matched, then the hose will have to be bent with the inherent danger of interference with the operation of the equipment if such bending is so extreme as to cause a kink in the hose.

SHORT OUTLINE OF THE PRESENT INVENTION

One object of the present invention is to devise a connector fitting which avoids such disadvantages of the prior art.

A further aim of the invention is to devise a connector fitting which while being manufactured at a low price is able to be simply and easily attached and even after being screwed into position may be readily adapted to be aligned with given directions of flow.

In order to achieve these or other objects appearing in the following specification, the shanks of the two connector sections are placed coaxially or at and angle to each other and the connection parts are integral in the case of a coaxial alignment, and in the case of an angled arrangement are joined together as two parts so that they may be swiveled in relation to each other. Therefore, in accordance with the invention, it is possible, even in the case of an elbow or angled fitting for assembly to take place very simply and after the one connector section has been secured in place it is still possible for the position of the second connector section to be reset. There is the advantage that the second section only has to be swiveled in relation to the first connector section until the desired setting has been attained. If for example one of the connector sections has a hose connector shank, it is then possible, even after the hose has been attached to the hose shank, to screw the threaded shank into the hole provided for it without hindrance by the attached hose on the shank. This is made possible by the swivel connection between the two connector sections. If the connector shanks are in a coaxial setting then there is the advantage of being able to dispense with the two-part design of the connector fitting since whatever the position in which the fitting has been mounted, the free connector shank will always be precisely determined. This furthermore makes it possible to select an integral form of the connector fitting so that production costs are considerably reduced.

Useful further developments of the invention will be seen from the claims.

In accordance with one development of the invention one of the connector sections carries a screw threaded shank so as to make it possible for the fitting to be joined with some other structure such as a manifold or the like. At the same time there is the possibility of swiveling the connector shank or shanks of the second section into the desired position so that even in awkward positions one may be assured of a safe and leakage-free connection being produced.

It is furthermore possible for the connector section having the threaded shank to carry an attachment collar which is coaxial to the threaded connector shank and is placed axially thereafter in relation to the second connector section. This makes it simpler to screw the threaded shank into another structure.

In order to lower the costs of manufacture with minimum fettling of the castings or moldings, the threaded shank and the attachment collar may be made integral and produced, for instance, by die casting.

As part of a further development of the invention, a tubular shank is integrally formed coaxially on the threaded shank, so as to extend away from the second connector section, to serve for the connection of a hose or other line. This provides the advantage of being able to couple two lengths of line or hose together with one length of hose fixed to the first connector section and the other hose placed on the tubular shank. The threaded shank then serves for holding the connector fitting on a cleat or the like, something that is more especially an advantage if the pieces of hose to be coupled are very long. The array is then kept firmly in place.

It is furthermore possible for the second connector section to be formed by the threaded connector shank, same being made integral with the first connector section. This development makes a further contribution to lowering the costs of production.

In order to increase the range of possible connection configurations, the hose connector shank of the second connector section is made at an angle to the axis of the first connector section.

The fitting may be made with an elbow or distributing member which is joined to the first connector section by way of a common male element so that they may be swiveled in relation to each other. This male element may have a male shank integrally formed on the first connector section (or on the elbow member of the second connector section) and which is inserted into a complementary female recess in the second connector section. The male element may be arranged so as to be centered on the axis of the attachment collar and the threaded shank formed thereon. As a further possibility the male element may carry a radially projecting flange or a crimped retaining border which is retained in a complementary groove in the female recess or fits round an annular step in such recess. It is possible to have a sealing ring between the male element and the wall of the recess.

These further optional features of the invention constitute simply produced forms of connection between the two connector sections so that they may be readily swiveled in relation to each other while simultaneously ensuring a high-grade sealing action. The presence of a sealing ring between the male element and the wall of the recess prevents the two connector sections being disengaged from each other when there is a high operating pressure.

In accordance with further features of the invention the longitudinal axis of the threaded shank is the axis of rotation of the second connector section and the tubular shank and/or the hose connector shank have a radial and coaxial annular bead at their free ends. This radial bead may have an external frustoconical form whose end with the smaller diameter is adjacent to the outer end of the tubular or hose connector shank. This annular projection may have the cross section of a saw tooth with a maximum external diameter larger than the external diameter of the corresponding line or hose connector shank.

These further features of the invention are intended to facilitate the insertion of the one connector shank into a line or hose so that same is held firmly in place and will not be pushed off the shank by high pressures. When a piece of elastic hose is fitted on the connector shank, the inner bore of the hose will be deformed as a sort of tooth and notch joint between the ring on the shank and the hose to prevent the hose slipping off the shank. In order to facilitate the fitting of the connector shank into the piece of hose or other line, the annular bead may be integrally formed right at the free end of hose connector shank and the bead has a short tubular head at its end furthest from the hose connector shank, such tubular head having a smaller external diameter than the hose connector shank.

In order to still further lower the costs of production of the connector fitting of the invention and at the same time to simplify its structure, the first or the second connector section, or both of them, is made by die casting. This feature at the same time ensures a low weight and a high pressure rating so that on the one time stock-holding of parts is simplified and on the other hand savings may be made in the weight of assemblies having a large number of connector fittings in accordance with the invention.

Various different embodiments of the connector fitting in accordance with the invention will now be described in detail with reference to the drawings herein.

LIST OF THE SEVERAL VIEWS OF THE DRAWINGS

FIG. 1 shows a first form of the connector fitting of the invention.

FIG. 2 is a view of a further embodiment of the connector fitting of the invention.

FIG. 3 is a view and part section of the connector fitting of the invention.

FIG. 4 shows a tee fitting in accordance with the invention.

DETAILED ACCOUNT OF WORKING EXAMPLES OF THE INVENTION

Figure 5:
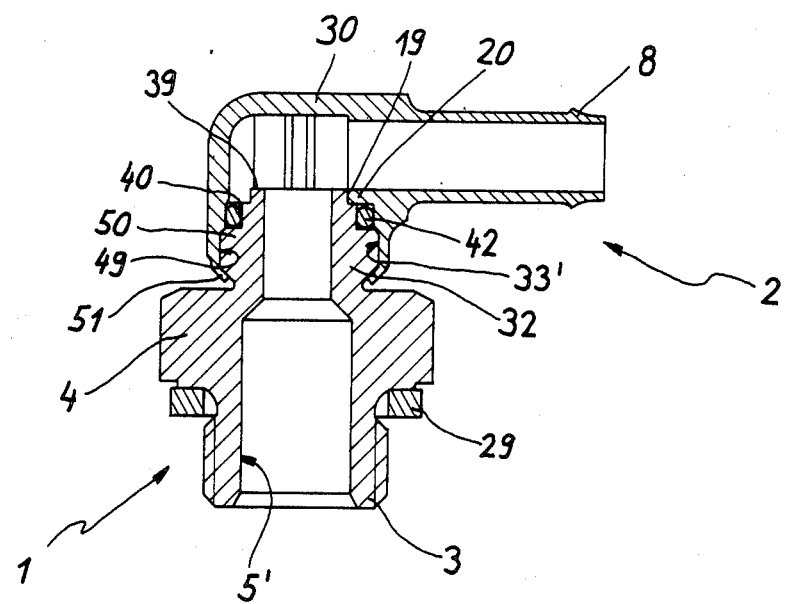
FIG. 5 shows another form of a tee connector fitting of the invention.

Turning more particularly to FIG. 1 of the drawings, the reader will see the first working example of the connector fitting of the invention, which will be seen to comprise two connector sections 1 and 2 each having a connector shank. The connector shank of the first connector section 1 is in the form of a threaded shank 3 for connection of the fitting with some other structure as for instance a manifold or a pressure vessel or the like by screwing into a port therein. Moreover the first connector section has an attachment collar 4 which is coaxial to the threaded connector shank 3 and made internally therewith. This attachment collar is in the form of a nut, and more especially a hex nut as shown, so as to facilitate the operation of screwing the threaded connector shank into the corresponding structure with which it is to be united. There is a common duct 5 coaxially extending through the threaded connector shank 3 and also through the attachment collar 4 as marked in broken lines, At one end this duct opens at the free end face 6 of the threaded connector shank 3 and, at the other end at the free end face 7 on the attachment collar 4. Therefore the openings are at opposite ends of the fitting.

The second connector section 2 is in the form of a hose connector shank 8 or spigot that is tubular in form and is produced integrally and coaxially on the end face 7 of the attachment collar 4 facing away from the threaded connector shank 3. The part 9 of the duct, formed inside the tubular cylindrical hose connector shank 8, joins the duct 5 in the first connector section 1 coaxially so that there is a single duct 10 running axially through the connector fitting and made up of the two duct parts 5 and 9.

On the free end 11 of the hose connector shank 8 remote from the attachment collar 4 there is an annular bead 12 which has the form of a frustum of a cone with a coaxial hole extending through it, whose base face with the large diameter is nearer the hose connector shank 8 and whose end face with the smaller diameter is remote therefrom. The larger or base diameter of the frustum of a cone is larger than the diameter of the hose connector shank 8 and its smaller diameter is smaller than it, so that the shoulder 14 between the end 11 of the hose connector shank 8 and the outer face of the bead 12 forms a barb 13 to lock the hose in place on the fitting by constituting a ring that is pressed into the bore surface of the hose. It will thus be seen that starting at the free end or shoulder 14 of the barb 13 there is conical form of the annular bead decreasing in diameter from the hose connector shank 8. Putting it differently, the barb 13 has a generally saw tooth radial section. The end remote from the hose connector shank 3 of the annular bead 12 is crowned by a short tubular head 15 whose outer diameter is equal to that of the adjacent end of the annular bead 12. The duct 10 extends through the barb 13 and the tubular head 15 so that this continuous passage terminates at one end at the free end face 6 of the threaded connector section and on the other at the free end of the tubular head 15.

The hose connector shank 8 is for insertion into line such as hose and more especially hose with elastic properties. The annular bead 12 is to prevent the hose being accidently pulled off the fitting. Further explanations of this feature will be given in the description of FIG. 3.

The connector fitting to be seen in FIG. 1 is made entirely integrally, more especially by die casting, as for example using zinc, aluminum or magnesium, so that there is a high degree of strength and hardly any need for fettling the castings, this again not being without a favorable influence on the costs of production. And at the same time there will be a substantial economy in weight.

FIG. 2 shows a further working example of the connector fitting of the invention. This design is in its main features similar to that of FIG. 1 so that there is again a second connector section 2 in the form of a hose connector shank 8 with the bead 12 formed thereon. The connector shank 8 is made in one piece with the attachment collar 4, which for its part is made integrally with the threaded connector shank 3. There is a departure from the construction of FIG. 1; the form to be seen in FIG. 2 has a tubular shank 16 integrally made on the end face 6 of the threaded connector shank 3, that is to say on the first connector section 1. This shank 16 serves for the connection of a further piece of hose or other line and it is coaxial to the other components 3, 4 and 8 of the connector fitting, which again has a continuous duct 10 extending through it from end to end. In order to affix a piece of hose securely on the hose shank 16, the end part of the shank 16 has a bead 12 or annular barb configured like that of the barb on the hose connector shank 8.

While in the case of the embodiment of FIG. 1 the threaded connector shank 3 was devised to be screwed directly into a screw threaded port in a manifold or the like, the threaded connector shank 3 of the connector fitting of FIG. 2 is designed to secure the fitting in a cleat 17. For such attachment the connector fitting is inserted into a suitable retaining opening 18 in the cleat and screwed fast in it by means of a nut 22 running on the threaded connector shank 3 so that the cleat is gripped between the nut 22 and the collar 4. The other end of the cleat 17 may may be secured to a bulkhead as indicated at 23.

The working example of a connector fitting described with reference to FIG. 2 is more especially suitable for the coupling together of lengths of hose or other line. The adjacent ends of the pieces of hose are simply and swiftly placed on the hose connector shank 8 and also over the tubular shank 16 so that the connection is made in an instant. This connector fitting is also made integrally so that it profits from the same advantages in this regard as the first embodiment described above. Dependent on the site of application, it is possible to have different lengths of threaded shank to suit different thicknesses of cleat 17 or the like. The shanks preferably have a fine thread.

The FIG. 3 shows an embodiment of the invention in the form of an elbow fitting with a change in the direction of flow of the fluid piped through about 90°. It has two connector sections 1 and 2 of which the first connector section 1 possesses a threaded connector shank 3 and the second connector section 2 has a hose connector shank 8. Like the embodiment of FIG. 1, the threaded connector shank 3 may be thought of as a coaxial extension on the attachment collar 4.

FIG. 3 shows the condition in which the connector fitting has its threaded connector shank 3 screwed into a port 24 in the wall 25 of a pressure vessel or the like. The port 24 is set at a right angle to the wall 25 through which it extends so that the duct portion 5' in the threaded connector shank 3 communicates with the interior 26 of the pressure vessel or the like. To ensure having a sealing connection between the connector section 1 and the wall 25 there is a sealing washer 29 between the annular face 27 of the attachment collar 4 next to the wall 25 and the outer surface 28 of the wall 25 around the threaded port 24. This sealing washer 29 surrounds the threaded connector shank 3 coaxially and prevents the leakage of fluid from the interior space 26.

The second connector section 2 is made separate from the first section and joined to it by a swivel joint since the second connector section 2 is fashioned with an elbow member 30 which on the one hand has a hose connector shank 8 and on the other hand has a male element 31 which also forms part of the first connector section 1.

On looking at the part of the figure showing the male element 31 it will be seen that it comprises a male shank 32 integral with the elbow member 30 and which is generally in the form of a hollow cylinder and cooperates with a recess 33 in the attachment of the first connector section 1. The recess 33 is a part of the duct 5' formed in the first connector section 1. The duct section 5' is stepped so that it firstly has a section 34 with a larger diameter extending along the length of the threaded connector shank 3 and across a certain amount of the breadth of the attachment collar 4 as measured in the length direction of the duct section 5'. At this point there is a concentric annular step 36 so that the further section 5' of the duct has a smaller diameter. It is this part with the smaller diameter 35 that forms the recess 33.

The male shank 32 formed on the elbow member 30 is inserted into the recess 33 from the side or end remote from the threaded connector shank 3 and then has its part extending past the duct section with a smaller diameter and into the duct section 34 with a larger diameter. The end 37 of the male shank 32 has a flange thereon projecting generally radially outwards so that there is a retaining rim 38 interlocking with the annular step 36 and connecting the two connector sections 1 and 2 together, preferably permanently. Between the retaining rim 38 and the annular step 36 there is a sealing ring 42 serving to provide a sealed joint. At the same time the end part 43, adjacent to the male shank 32, of the elbow member 30 is engaged with the attachment collar 4 so that axial motion of the male shank along the duct section 5' is not possible. In this respect the sealing ring 42 at the same time serves to load the elbow member 30 in relation to the attachment collar 4 while still permitting swiveling of the elbow member 30 around the lengthways axis of the duct section 5'.

The male shank 32 possesses a coaxial duct section 9' opening at one end into the duct section 34 with the larger diameter and at the other end extending through the elbow member 30 with a corresponding change in direction to be continued in the hose connector shank 8. The duct 5' and 9' in the connector fitting is generally in the shape of a letter L with a right angle change in direction.

The elbow member 30 is generally in the form of a cube with one of the sides of the cube bearing the male shank 32 and a further cube side 44 adjacent and at a right angle thereto bears the hose connector shank 3. The two shanks 32 and 8 are placed at an angle to each other. This angle may be a right angle or some other angle as dictated by the design requirements. FIG. 3 shows a design with a right angle. The cube sides of the elbow member have rounded corners in order to present an attractive appearance.

It is an advantage if the elbow member 30 is made integrally both with the male shank 32 and also with the hose connector shank 8. At its free end the hose connector shank 8 has a bead 12 for cooperation with the hose 45 placed on it. On its inner bore face the hose 45 is elastically and annularly dented at the annular bead 12 (at 41) so that there is a sort of tooth and notch engagement between the annular bead 12 and the hose 45 to secure the hose firmly on the shank.

It is further to be noted in connection with the male element 31 that other configurations are obviously possible in addition to the one described above. It would for example be possible to have a radial, annular bead for snapping into a complementary groove in the wall of the recess. In this case the connection with the male element might be designed to be disconnectable. It is also to be noted again that the male element allows swiveling of the second connector section 2, in relation to the first connector section 1, about its longitudinal axis 46 whatever the modification in the design. The connection does however prevent displacement in the axial direction. The connection between the two connector sections 1 and 2 may therefore be termed a swivel connection.

A brief account of a further embodiment of the invention will now be given with reference to FIG. 4 in the form of a further connector fitting. The fitting shown is in the form of a tee fitting with the first connector section 1 having the attachment collar 4 and the threaded connector shank 3, being similar in design to the form described with reference to FIG. 3. It will furthermore be seen that there is an elbow member 30' on the second connector section 2 and that, in the way as described above, the elbow member is connected via a male element 31 with the first connector section 1. In a way different to the other form of the invention shown in FIG. 3, the elbow member 30' carries two hose connector shanks 8 which are placed coaxially in relation to each other and are formed on opposite sides 47 and 47' of the double elbow member 30'. The common longitudinal axis 48 of the two hose connector shanks 8 is at a right angle to the longitudinal axis 46 of the first connector section 1. The duct section 9" within the tee member 30' has its two branches extending into the hose connector shank 8 and it joins with the duct 5' present in the first connector section 1. The second connector section 2 may be swiveled in relation to the first connector section 1 about the longitudinal axis 46 so when the threaded connector shank 3 has been screwed into place the connector section 2 with the two hose connector shanks 8 branching from it may be turned into any desired setting.

It will be clear that the arrangement of the two hose connector shanks 8 at a right angle to the threaded connector shank 3 is not essential and that there is no need to have the two hose connector shanks coaxial to each other. Furthermore it is possible to have more than two hose connector shanks 8 on the member 30' all joining with the duct section 5' in the first connector section 1.

It is to be noted in addition that the bead 12 of the hose connector shank 8 may also be made in a multistage form so that there will be consecutive annular beads 12 following each other in the length direction of the respective hose connector shank with an increase in the diameter of the barbs towards the member 30'. There is also an advantage to be gained by having the annular beads 12 on the outer face of the hose connector shanks 8 as well.

FIG. 5 is a view of a preferred fitting of the invention. Unlike the connector fitting of FIG. 3, male shank 32 is coaxial to the collar 4 of the first section 1 on the side remote from the shank 3. Thus the male shank 32 projects axially from the section 1 and is plugged into a recess 33' made in the member 30. In this respect the shank 32 has a retainer bead 50 radially projecting from its outer face to fit into a groove 49 in the member 30. The swivel joint is preferably permanent and produced by firstly inserting the shank 32 into the recess 33' and then crimping the edge 51 (which coaxially fits around the bead 50) of the member 30 to lock the bead 50 and it is not possible for it to slip out. At the free end of the male shank 32 there is a peripheral groove 40 from the end face 39 and the sealing ring 42 is placed in this groove. This ring provides a seal between the first and second connector sections 1 and 2 since the outer edge of the ring engages the wall of the recess 33' and its inner periphery engages the floor of the groove.

In order to axially lock the male shank 32 while allowing its rotation, there is an annular step 19 in the end face 39 coaxial to the male shank 32 and such step 19 is engaged by a coaxially formed retaining edge 20 of the elbow member 30. The annular step 19 and the retaining edge 20 therefore cooperate with each other and resist the clamping force produced by the crimped edge 51 so that the male shank 32 is axially urged into the recess 33'. The annular step 19, the peripheral groove 40 and the bead 50 have diameters increasing from the end face of the male shank 32 in the axial direction. The external diameter of the bead 50 is greater than that of the groove 40 and this in turn exceeds the external diameter of the annular step 19. The depth of penetration of the male shank 32 is preferably such that its end face 39 is aligned with the bore face of the duct in the hose connector shank 8 in the inserted condition. The duct section 5' extending coaxially through the first connector section 1 is made with steps and has a larger diameter at the threaded connector shank 3 and at the attachment collar 4 than at the male shank 32, such three parts having the duct extending axially through them. The reduction in cross section in the duct section 5' is generally at the transition from the attachment collar 4 to the male shank 32. Preferably, the external diameter of the male shank 32 is less than that of the attachment collar 4 and of the threaded shank 3.

I claim:

1. A fluid power connector fitting for the connection of a length of flexible hose to another structure, comprising a first connector section having one end carrying a first connector shank for connection to the other structure, and an opposite end carrying a male shank, said first connector section being made of one piece of material and having a duct section therethrough for carrying a fluid, and a second connector section having a second connector shank at one end, said second connector section being in the form of a one piece angled distributor piece having a recess at an end thereof opposite from said second connector shank, said distributor piece having a duct section extending therein and through said second connector shank, said duct section of said distributor piece communicating with said duct section of said first connector section and extending at an angle thereto to form a fluid passage through said first and second connector sections, said male shank extending into and being mounted for swivelling in said recess of said second connector section, said distributor piece being shaped adjacent its recess for retaining said male shank in said recess.

2. A connector fitting as claimed in claim 1 wherein said first connector shank comprises a threaded shank, said first connector section having a radially outwardly extending collar disposed between said male shank and said first connector shank.

3. The connector fitting as claimed in claim 2 wherein the said male shank is placed so as to be coaxial to the collar and the threaded shank formed thereon.

4. The connector fitting as claimed in claim 3 wherein the male shank has formed thereon a radially projecting member engaged into a groove in a wall of said recess.

5. The connector fitting as claimed in claim 4 comprising a sealing ring positioned between the male shank and the recess.

6. The connector fitting as claimed in claim 5 wherein said connector sections are permanently swivel-connected with each other.

7. The connector fitting as claimed in claim 6 wherein the second connector section is arranged to swivel about the longitudinal axis of the threaded shank.

8. A connector fitting according to claim 7, wherein said second connector section has a retaining edge between said second connector shank and said recess, said male shank of said first connector section having an end face defining a small diameter annular step engaged against said retaining edge for limiting the depth of penetration of said male shank into said recess, said male shank having an end groove adjacent said annular step which is of a larger diameter than said annular step having an open end facing said retaining edge, said end groove being annular and receiving said sealing ring, said radially projecting member of said male shank defining an annular retaining bead having a conical section adjacent said collar of said first connection section, said connector section being permanently swivel-connected with each other by said second connector section having a crimped edge at an opening of said recess crimped against said conical section of said male shank for retaining said male shank in said recess.

9. The connector fitting according to claim 8 including a washer engaged on said first connector section between said first connector shank and said collar, said collar comprising a polygonal nut for tightening said thread shank which forms said first connector section onto a structure.

* * * * *